No. 638,336. Patented Dec. 5, 1899.
C. F. HUNTOON.
SIDE BEARING FOR RAILWAY CARS.
(Application filed July 10, 1899.)

(No Model.) 2 Sheets—Sheet 1.

Witnesses:
J. M. Fowler Jr.
M. Darley.

Inventor
Charles F. Huntoon
By F. W. Ritter Jr.
Attorney

No. 638,336. Patented Dec. 5, 1899.
C. F. HUNTOON.
SIDE BEARING FOR RAILWAY CARS.
(Application filed July 10, 1899.)
(No Model.) 2 Sheets—Sheet 2.
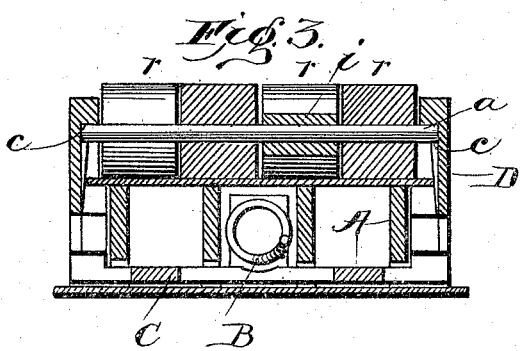
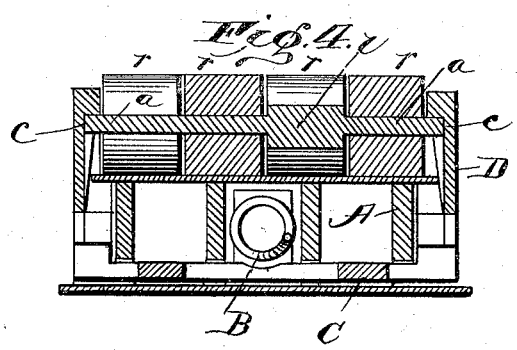
Witnesses.
J. M. Fowler Jr.
On. Darley.
Inventor:
Charles F. Huntoon
by F. W. Ritter Jr.
Attorney

UNITED STATES PATENT OFFICE.

CHARLES F. HUNTOON, OF CHICAGO, ILLINOIS, ASSIGNOR TO THE CHICAGO RAILWAY EQUIPMENT COMPANY, OF SAME PLACE.

SIDE BEARING FOR RAILWAY-CARS.

SPECIFICATION forming part of Letters Patent No. 638,336, dated December 5, 1899.

Application filed July 10, 1899. Serial No. 723,321. (No model.)

*To all whom it may concern:*

Be it known that I, CHARLES F. HUNTOON, a citizen of the United States, residing at Chicago, in the county of Cook, State of Illinois, have invented certain new and useful Improvements in Side Bearings for Railway-Cars; and I hereby declare the following to be a full, clear, and exact description of the same, reference being had to the accompanying drawings, in which—

Figure 1:
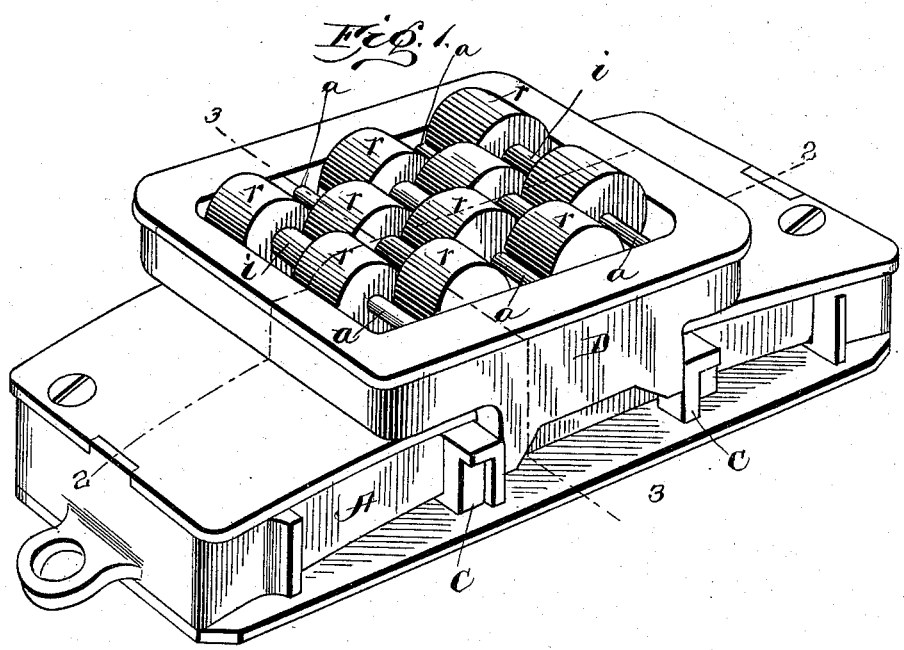
Figure 2:
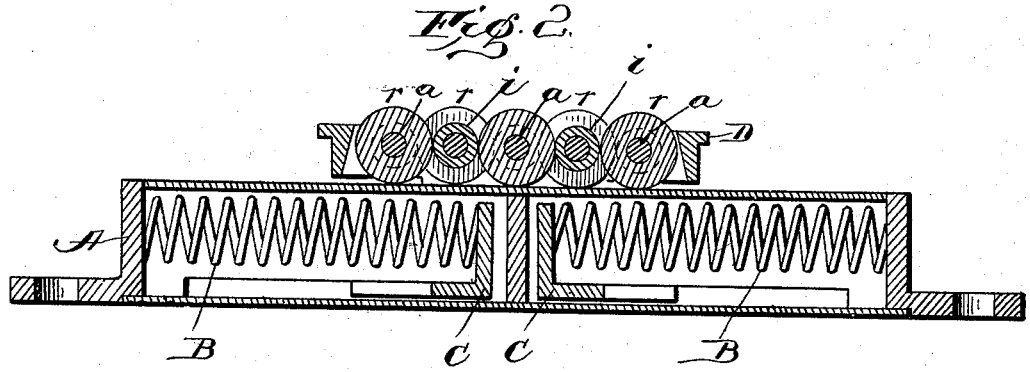

Figure 1 is a perspective view of a side bearing embodying my invention. Fig. 2 is a longitudinal vertical section taken on the line 2 2, Fig. 1. Fig. 3 is a transverse vertical section taken on the line 3 3, Fig. 1. Fig. 4 is a sectional view of a modification of the bearing shown in Figs. 1 to 3.

Like symbols refer to like parts wherever they occur.
My invention relates to the construction of that class of devices commonly known as "side bearings for railway-cars," and especially to that class wherein are combined a series of small overlapping rollers arranged in rows, and has for its objects, first, to transmit the motion from roller to roller throughout the series, and, second, to distribute the load or pressure uniformly throughout the series of rollers, thus obviating any tendency to sliding, unequal wear, or flattening of the rollers, as well as any cramping of the side bearing and distortion of the roller-shafts.

To this end the main feature of my invention, generally stated, is embraced in the combination, with a series of antifriction-rollers arranged in a common plane constituting a side bearing, of a series of interposed idlers which communicate the motion from roller to roller of the series and support the rollers of the series against lateral pressure.

There or other minor features of invention, all as will hereinafter more fully appear.

For the purposes of this specification I have seen fit to illustrate my invention as applied to the class of side bearings wherein the antifriction-rollers constituting the side bearing are short rollers arranged in rows, the rollers of the adjacent rows overlapping said rollers loosely journaled on shafts, which shafts are in turn loosely journaled in bearings on a frame or carriage; but I do not intend that the claims hereinafter made shall be limited to said special form of construction, as it is evident that wherever a series of independent antifriction-rollers arranged in a common plane may be combined to constitute a side bearing the interposed idlers may be employed in the given combination and with like results.

In that class of side bearings wherein the independent antifriction-rollers are movably journaled upon shafts it is evident that the shafts on which the rollers are journaled may be either fixed or themselves journaled or movable, and in either case the interposed idlers may be sleeves or rollers journaled upon the shafts which carry the antifriction-rollers of the bearing with which said idlers are combined, and such being the preferred method of carrying out my invention has been shown in Figs. 1 to 3 of the drawings and embodies a secondary feature of my invention. It will, however, be evident to one skilled in the art, or even to the ordinary mechanic, that in case the shafts on which the antifriction-rollers are loosely journaled are themselves journaled or movable in the main frame the interposed idlers may be formed as collars upon or integral with the shafts, as shown in the modification, Fig. 4, without departing from the spirit of my invention, and all similar or equivalent constructions are intended to be contained within the scope of the claims hereinafter made.

I will now proceed to describe my invention more fully, so that others skilled in the art to which it appertains may apply the same.

In the drawings, A indicates a housing or base for containing centering-springs B B and interposed yokes or spiders C C, whereby the frame or carriage D of the side bearing is, when relieved of its load, returned to the central position from its travel in either direction.

The side bearing in the present instance is composed of a series of rows of short rollers, arranged in a common plane, journaled upon a series of shafts *a a*, &c., each shaft carrying two rollers *r r*, the rollers of the adjacent rows overlapping and the shafts *a a* loosely journaled in the frame or carriage D, as indicated at *c*, and radially positioned with relation to the center-bearing of the truck, all of which being substantially what is shown and described in the patent of J. C. Wands, No. 590,286, dated September 21, 1897, and for which any equivalent may be substituted, need not be herein more fully described.

In carrying out my invention I interpose between the several antifriction-rollers $r\ r$ of the side bearing, or so many of said rollers as will serve to communicate the motion throughout the series of antifriction-rollers constituting the side bearing, a series of idlers $i\ i$, which may be either short sleeves or rollers (see Figs. 1 to 3) of a diameter equivalent to the width of space between the antifriction-rollers $r\ r$ of any given row, and said idlers $i\ i$ may be loose upon the shafts $a\ a$, or, if preferred, and in case the shafts $a\ a$ are themselves loosely journaled in the frame or carriage, (see Fig. 4,) may be formed integral with or as collars shrunk upon the shafts $a\ a$ and movable with the said shafts. The length of the idlers $i$ will preferably be substantially the length of the antifriction-rollers $r\ r$ constituting the bearing, and it will be at once evident to those skilled in the art that a sleeve or roller-idler detachable from the shaft is preferable to one integral therewith, as in the latter case the rows of short overlapping antifriction-rollers can be multiplied indefinitely and the idlers can not only be interposed between the rows of rollers $r\ r$, as shown, but also, if desired, between the rollers and the frames, so as to more effectually support the shafts $a\ a$ against torsion and lateral stress.

Having described my invention, what I claim, and desire to secure by Letters Patent, is—

1. In a side bearing for railway-cars, the combination with a series of antifriction-rollers arranged in a common plane, of a series of interposed idlers, substantially as and for the purposes specified.

2. In a side bearing for railway-cars, the combination with a plurality of rows of antifriction-rollers arranged in a common plane, the rollers of the adjacent rows overlapping, of a series of interposed idlers, substantially as and for the purposes specified.

3. In a side bearing for railway-cars, the combination with a plurality of overlapping antifriction-rollers and their shafts arranged in a common plane, of a series of idlers interposed between the antifriction-rollers and loosely journaled upon the shafts of said antifriction-rollers, substantially as and for the purposes specified.

In testimony whereof I affix my signature, in presence of two witnesses, this 8th day of July, 1899.

CHARLES F. HUNTOON.

Witnesses:
E. T. WALKER,
F. V. LINDSEY.